United States Patent [19]

Lee et al.

[11] Patent Number: 4,572,918

[45] Date of Patent: Feb. 25, 1986

[54] FOAMABLE POLYORGANOSILOXANE COMPOSITIONS

[75] Inventors: Chi-Long Lee; James A. Rabe, both of Midland, Mich.

[73] Assignee: Dow Corning Corporation, Midland, Mich.

[21] Appl. No.: 766,621

[22] Filed: Aug. 19, 1985

Related U.S. Application Data

[60] Continuation-in-part of Ser. No. 708,188, Mar. 4, 1985, which is a division of Ser. No. 665,272, Oct. 26, 1984, Pat. No. 4,518,716.

[51] Int. Cl.$^4$ .............. C08J 9/08; C08J 9/10; C08J 9/12

[52] U.S. Cl. .................... 521/91; 521/98; 521/122; 521/131; 521/133; 521/134; 521/139; 521/154; 524/588; 525/477; 528/30; 528/33; 528/42

[58] Field of Search .............. 521/91, 98, 122, 131, 521/133, 134, 139, 154; 525/477

[56] References Cited

U.S. PATENT DOCUMENTS

| | | | |
|---|---|---|---|
| 2,676,182 | 4/1954 | Daudt et al. | 260/448.2 |
| 3,024,210 | 3/1962 | Weyer | 260/2.5 |
| 3,070,555 | 12/1962 | Burner, Jr. | 260/2.5 |
| 3,328,349 | 6/1967 | Lentz | 260/46.5 |
| 3,338,847 | 8/1967 | Nitzsche et al. | 260/2.5 |
| 3,923,705 | 12/1975 | Smith | 260/2.5 |
| 4,026,845 | 5/1977 | Kim et al. | 260/2.5 |
| 4,229,548 | 10/1980 | Sattlegger et a. | 521/110 |
| 4,234,697 | 11/1980 | Homan et al. | 521/128 |
| 4,239,674 | 12/1980 | Homan et al. | 260/37 SB |
| 4,368,279 | 1/1983 | Modic et al. | 521/122 |
| 4,418,157 | 11/1983 | Modic | 521/82 |

FOREIGN PATENT DOCUMENTS 2909443 9/1980 Fed. Rep. of Germany .
2911971 10/1980 Fed. Rep. of Germany .

*Primary Examiner*—Morton Foelak
*Attorney, Agent, or Firm*—Robert Spector

[57] ABSTRACT

Polyorganosiloxane foams exhibiting a desirable combination of low density, an average cell size below 4 mm. and an average cell concentration greater than 4 per linear centimeter are obtained by dispensing oxygen curable mercaptoorganosiloxane compositions containing a cobaltocene catalyst, a dispersed liquid or gaseous blowing agent and, as a foam stabilizer, a resinous organosiloxane copolymer comprising trimethylsiloxy units, $SiO_{4/2}$ units and specified fluorine-containing organosiloxane units. The polymer portion of the composition includes at least one polyorganosiloxane containing at least 20 mole percent of dimethylsiloxane units and an average of more than 2 mercaptoalkyl or mercaptoalkylene groups per molecule.

20 Claims, No Drawings

FOAMABLE POLYORGANOSILOXANE COMPOSITIONS

REFERENCE TO RELATED APPLICATIONS

This application is a continuation-in-part of copending application Ser. No. 708,188 filed Mar. 4, 1985, which in turn is a division of application Ser. No. 665,272, filed Oct. 26, 1984, and now U.S. Pat. No. 4,518,716.

FIELD OF THE INVENTION

This invention relates to the preparation of cured polyorganosiloxane foams. More particularly, this invention relates to foamable polyorganosiloxane compositions which are stable when stored in pressurized containers that exclude oxygen. Useful foams exhibiting uniformly small cells are obtained when these compositions are dispensed and cured in the presence of oxygen.

BACKGROUND INFORMATION

One of the known methods for preparing polyorganosiloxane foams involves the reaction of polyorganosiloxanes containing silicon-bonded hydroxyl groups with organosilicon materials containing silicon-bonded hydrogen atoms in the presence of a suitable catalyst. Reactants containing silicon-bonded vinyl radicals can be included in the composition to enhance the properties of the final cured foam. Foams of this type are disclosed in U.S. Pat. No. 3,024,210 to Weyer, which issued on Mar. 6, 1962, U.S. Pat. No. 3,070,555 to Bruner, which issued on Dec. 25, 1963, U.S. Pat. No. 3,338,847 to Nitzche et al., which issued on Aug. 29, 1967 and U.S. Pat. No. 3,923,705 to Smith, which issued on Dec. 2, 1975.

In the absence of an inhibitor, compositions containing hydroxyl groups, silicon-bonded hydrogen atoms and a platinum-based catalyst begin to react at ambient temperature almost as soon as the reactants containing these groups are combined. Inhibitors such as acetylenic alcohols at least partially suppress the reactivity of the composition at 25° C., and the composition must be heated to temperatures of 75° C. or higher to produce a foam. Such compositions cannot be used as storage stable one-part formulations for preparing cured foams at room temperature.

The preparation of foams by the action of a blowing agent within moisture curable room temperature vulcanizable (RTV) polyorganosiloxane compositions is known. These compositions typically contain a liquid hydroxyl endblocked polydiorganosiloxane and a liquid or solubilized crosslinker containing 3 or more silicon-bonded groups which undergo hydrolysis readily at room temperature in the presence of atmospheric moisture.

The relatively slow curing rate that characterizes RTV compositions is particularly disadvantageous for the preparation of foams. At the relatively low viscosity desired to facilitate blending and transportation of the foamable composition, the partially cured foams tend to collapse when the introduction or evolution of blowing agent ceases, and at least a portion of the uncured liquid reactants in the cell walls drains from the foam. In addition to causing a collapse of the foam, the liquid which drains cures to a solid rubber.

In U.S. Pat. No. 4,368,279, which issued on Jan. 11, 1983, F. J. Modic and B. E. Boudreau teach that the collapse of foams obtained by beating air or other gaseous blowing agent into RTV polyorganosiloxane compositions can be avoided by placing the uncured foam under a vacuum equivalent to a maximum pressure of 79.8 kPa for at least 5 minutes. The curable compositions disclosed by Modic and Boudreau contain a silanol terminated polydiorganosiloxane base polymer, a crosslinking agent, a curing promoter and, in the case of one-part compositions, a small amount of water.

While the use of vacuum during curing may be practical for machine made foams such as slab stock and molded foams, this technique cannot be used when the foam is formed within a cavity of a building or at other locations where it is not feasible to maintain the foam under vacuum during curing. In addition, the necessity of mixing in a gaseous blowing agent at the time the foam is formed requires that mixing and aerating equipment be transported to the location where the foam is to be installed. For some applications, particularly those requiring relatively small amounts of foam at relatively remote locations, such equipment would not be practical. In these instances it would be considerably more convenient to employ a one-component foamable composition, including a blowing agent, packaged in a container that can be easily transported to the application site and which is capable of repeatedly dispensing the foamable composition without the need for additional processing steps or ingredients.

U.S. Pat. No. 4,229,548, which issued on Oct. 21, 1980 to Sattleger et al. discloses a 2-compartment aerosol type container for storing and dispensing a foamable polyorganosiloxane composition. The container consists of an inner compartment containing a foamable, moisture curable RTV composition that includes a hydroxy-endblocked polydiorganosiloxane, a curing agent and, optionally, a gaseous blowing agent. The inner compartment is separated by a flexible wall from an outer compartment containing a moisture free inert gas under a pressure of from 0.2 to 3.0 megapascals. The container is equipped with a valve through which the foamable composition is dispensed under the pressure of the gas confined in the outer compartment of the container. The formation of polyorganosiloxane foams by dispensing a one-part moisture curable RTV polyorganosiloxane composition stored under pressure in a 2-compartment container is also taught in German published application Nos. 2,909,443 (published Sept. 18, 1980) and 2,911,971 (published Oct. 9, 1980).

Foams produced by dispensing silica-filled RTV polyorganosiloxane compositions, including a blowing agent and/or a propellant, from pressurized containers, such as aerosol cans, are characterized by densities from 0.58 to 0.81 g./cc. Attempts to minimize collapse of the cellular structure in partially cured foams by the use of vacuum, by heating to accelerate curing or by other means usually results in increased density. Furthermore, the additional processing steps more than offset the advantages achieved using foamable compositions packaged under pressure in portable containers such as aerosol cans.

The art discloses additives for reducing the density of polyorganosiloxane foams formed by the reaction of silicon-bonded hydroxyl groups with silicon-bonded hydrogen atoms. U.S. Pat. No. 4,026,845, which issued on May 31, 1977 to Y. K. Kim et al., teaches using known fluorine-containing surfactants for this purpose. The surfactants contain fluorine atoms bonded to carbon, and include both organic and organosilicon compounds.

Oxygen curable mercaptoorganosiloxane compositions that include a cobaltocene compound of the formula (R*C$_5$H$_4$)CO(C$_5$H$_4$R*) as a catalyst are disclosed in U.S. Pat. No. 4,239,674, which issued to Homan and Lee on Dec. 16, 1980. These compositions cure considerably faster than most moisture curable polyorganosiloxane compositions and offer the additional advantage of not generating acetic acid or other by products characteristic of moisture curable polyorganosiloxanes. In the foregoing formula, each R* is individually selected from hydrogen and methyl. The formation of sponge rubber by combining one of the aforementioned mercaptoorganosiloxanes with an isocyanate and water is taught in U.S. Pat. No. 4,234,697 which issued to Homan and Lee on November 18, 1980.

SUMMARY OF THE INVENTION

An objective of this invention is to provide foamable, oxygen curable RTV polyorganosiloxane compositions capable of being packaged and stored in pressurized containers in combination with a blowing agent. When dispensed into an area under atmospheric pressure, the compositions form liquid froths that retain a major portion of their initial height during the curing reaction whereby the froths are converted to closed cell foams containing a homogeneous distribution of small cells.

It has now been found that the stability of partially cured foams prepared by dispensing oxygen curable polyorganosiloxane compositions containing a dispersed blowing agent from pressurized containers is improved by including in said compositions a resinous organosiloxane copolymer comprising trimethylsiloxy units, SiO$_{4/2}$ units and fluorine-containing units. The polymer portion of the polyorganosiloxane compositions can be a polydimethylsiloxane or a copolymer comprising at least 20 mole percent of dimethylsiloxane units in combination with other organosiloxane units and contains an average of at least two mercapto groups per molecule. The compositions also include a cobaltocene compound as a curing catalyst.

DETAILED DESCRIPTION OF THE INVENTION

This invention provides a foamable polyorganosiloxane composition exhibiting a viscosity of from 0.5 to 500 Pa.s at 25° C. in the absence of blowing agents, where said composition is stable under anaerobic conditions and superatmospheric pressure, and in the presence of oxygen and atmospheric pressure yields a cured, closed cell polyorganosiloxane foam exhibiting a uniform distribution of cells no larger than about 4 mm., said composition comprising the product obtained by mixing in the absence of oxygen (A) an oxygen curable elastomeric composition comprising (1) a mercaptoorganosiloxane polymer containing an average of more than two siloxane units per molecule having a mercaptoalkyl or mercaptoalkylene group bonded to silicon, the remaining siloxane units exhibiting the average formula R$_p^1$SiO$_{(4-p/2)}$ where each R$^1$ individually represents an alkyl radical containing from 1 to 4 carbon atoms, a phenyl radical, a 3,3,3-trifluoropropyl radical or an alkoxy radical containing from 1 to 4 carbon atoms, with the proviso that at least 20 mole percent of said siloxane units are dimethylsiloxane, said mercaptoalkylene radical is —CH$_2$—CH(SH)—CH$_2$—CH$_2$—, said mercaptoalkyl group contains from 1 to 4 carbon atoms and the value of p is from 1.5 to 2.5, and (2) a cobaltocene of the formula (R$^2$C$_5$H$_4$)Co(C$_5$H$_4$R$^3$) in an amount sufficient to promote curing of (1) in the presence of oxygen, where R$^2$ and R$^3$ are individually selected from hydrogen and methyl; (B) an amount of a foam stabilizer sufficient to stabilize said foam during the curing process, where (B) consists essentially of a resinous, benzene-soluble organosiloxane copolymer consisting essentially of SiO$_{4/2}$ units, silicon-bonded hydroxyl groups, (CH$_3$)SiO$_{\frac{1}{2}}$ units and fluorine-containing units selected from the group consisting of R$_a$R'$_b$SiO$_{(4-a-b)/2}$, R''[Si(R')$_b$O$_{(3-b)/2}$]$_2$ and mixtures thereof, where R is a monovalent organic radical containing at least four perfluorinated carbon atoms and is bonded to the silicon atom of said fluorine-containing units by a sequence of at least two methylene units or by an oxygen atom that is in turn bonded to a sequence of at least two methylene units, R' is an alkyl radical containing from 1 to 3 carbon atoms, R'' is a divalent organic radical containing at least four perfluorinated carbon atoms and is bonded to the silicon atom of said fluorine-containing units by a sequence of at least two methylene units or by an oxygen atom that is in turn bonded to a sequence of at least two methylene units, a is 1 or 2, b is 0, 1 or 2, and the sum of a and b is 3 or less with the proviso that when R and R'' are bonded to silicon via an oxygen atom the organosiloxane copolymer optionally contains repeating units of the formula GSiO$_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than hydroxyl and SiO$_{4/2}$ units to SiO$_{4/2}$ units is from 0.7:1 to 1.1:1, inclusive, and the concentration of said fluorine-containing units and any GSiO$_{3/2}$ units is sufficient to (a) impart a surface tension of less than 2.2×10$^{-4}$ newtons per centimeter at 25° C. to a 10 percent by weight solution of (B) in a hydroxyl endblocked polydimethylsiloxane exhibiting a viscosity of 0.08 Pa.s at 25° C. and (b) require the addition of from 0 to 100 percent by weight of xylene to said 10 percent by weight solution, to achieve optical clarity; and (C) a blowing agent in an amount sufficient to convert said polyorganosiloxane composition to a foam under atmospheric pressure and at a temperature of 25° C.

A characteristic feature of the present foamable polyorganosiloxane compositions that distinguishes them from prior art foamable polyorganosiloxane compositions is the novel foam stabilizer, referred to hereinafter as (B). When the present stabilizers are combined with an oxygen curable elastomeric composition, referred to hereinafter as (A), a blowing agent, referred to hereinafter as (C), and any optional ingredients such as fillers the resultant composition can be packaged in a pressurizable container such as an aerosol can and subsequently dispensed to yield useful moisture cured foams, providing that the viscosity of the composition is from 0.5 to 500 Pa.s in the absence of the blowing agent.

Oxygen curable elastomeric organosiloxane compositions, referred to herein as (A), are known. Preferred compositions are described in the patent to Homan and Lee cited hereinabove. The compositions of Homan and Lee contain a minimum of one each of the mercaptoorganosiloxanes and cobaltocene catalysts corresponding to the preceding formulae.

The substituents bonded to the silicon atoms of the mercaptoorganosiloxane can be alkyl containing from 1 to 4 carbon atoms, phenyl, 3,3,3-trifluoropropyl or alkoxy containing from 1 to 4 carbon atoms, the only proviso being that at least 20 mole percent of the repeating units of the mercaptoorganosiloxane are dimethylsiloxane units. To ensure compatability with the other ingredients of the foamable composition preferably at least 90 percent, most preferably 100 percent, of the substituents other than mercaptoalkyl or mercaptoalkylene are methyl.

The siloxane units which do not contain mercapto groups can be $SiO_{4/2}$ units, monosubstituted units such as methylsiloxane or phenylsiloxane, disubstituted units such as dimethylsiloxane, phenylmethylsiloxane or methyl-3,3,3-trifluoropropylsiloxane, or trisubstituted units such as trimethylsiloxane or dimethylphenylsiloxane. The relative concentrations of $SiO_{4/2}$ units, mono-, di-, and trisubstituted units are such that in the foregoing formula for the average siloxane unit $R_pSiO_{(4-p)/2}$ the average value of p is from 1.5 to 2.5, inclusive.

In order to form a cured elastomeric foam when incorporated into the foamable compositions of this invention, the mercaptoorganosiloxane should contain an average of more than 2 mercapto (SH) groups per molecule. Preferably this value is from 3 to 6. The mercaptoorganosiloxane can be a single polymer containing 3 or more mercapto groups per molecule. Alternatively, one or more polymers of this type can be combined with one or more mercaptoorganosiloxanes containing 2 mercapto groups per molecule.

Methods for preparing mercaptoorganosiloxanes suitable for use in the foamable compositions of this invention are disclosed in the prior art. One method for preparing a type of pendant-functional mercaptopolydiorganosiloxane containing $(HSC_nH_{2n})R_4SiO$, $R_2^4SiO$ and $R_3^4SiO_{\frac{1}{2}}$ units is taught by Viventi in U.S. Pat. No. 3,346,405, which issued on Oct. 10, 1967. Another method is described in U.S. Pat. No. 4,133,939, which issued to Bokerman and Gordon on Jan. 9, 1979. A procedure for making both pendant-functional and terminal-functional types of mercaptopolydiorganosiloxanes containing 2-mercaptotetramethylene substituents is disclosed in U.S. Pat. No. 3,655,713, which issued to LeGrow on Apr. 11, 1972.

In the foregoing formulae, $R_4$ represents alkyl containing from 1 to 4 carbon atoms, phenyl, 3,3,3-trifluoropropyl or alkoxy containing from 1 to 4 carbon atoms, with the aforementioned proviso that the mercaptoorganosiloxane contains at least 20 mole percent of dimethylsiloxane units, and n is from 2 to 4.

Several methods for producing terminal-functional mercaptopolydiorganosiloxanes containing $(HSC_nH_{2n})R_2^4SiO_{0.5}$ siloxane units are known. One method involves the use of a disiloxane bearing a silicon-bonded mercaptoalkyl radical such as sym-tetramethyl bis(3-mercaptopropyl)disiloxane, and a cyclic polydiorganosiloxane such as octamethylcyclotetrasiloxane. Appropriate amounts of the mercapto-functional disiloxane and cyclic polydiorganosiloxane are heated together with an acidic catalyst such as trifluoromethanesulfonic acid for 3 to 8 hours. The mixture is then neutralized and the mercapto-terminated polydiorganosiloxane is recovered. Hybrid-functional polymers containing both terminal and pendant mercapto groups can be prepared using the same type of compounds and techniques outlined above for producing terminal-functional mercaptopolydiorganosiloxanes by adding a cyclic mercapto substituted polydiorganosiloxane such as $[HSCH_2CH_2CH_2(CH_3)SiO]_4$ to the reaction mixture to introduce pendant-functional groups into the mercaptopolydiorganosiloxane. Likewise, the compounds and techniques used in preparing pendant-functional mercaptopolydiorganosiloxanes can be used to produce hybrid-functional types by at least partially replacing mercapto-functional endblocking units derived from the aforementioned sym-tetramethyl bis(3-mercaptopropyl)disiloxane, with non-functional endblocking units derived from hexamethyldisiloxane.

Compositions with various properties can be formulated using the above mercaptopolydiorganosiloxanes. Generally, use of only the pendant-functional mercaptopolydiorganosiloxanes results in elastomers with higher modulus values than formulations which additionally include terminal-functional mercaptopolydiorganosiloxanes. The latter yield elastomers with lower modulus values which are thus capable of much greater elongation before the cured composition tears. As a result, the use of only pendant-functional mercaptopolydiorganosiloxanes results in cured foams which are less readily elongated and are therefore primarily useful where there is only a small amount of movement in the joint to be sealed. Combinations of the pendant- or hybrid-functional and terminal-functional mercaptopolydiorganosiloxanes are preferred where the foams are desired for use in applications where a relatively large degree of joint movement occurs as the result of varying temperatures.

Catalysts that promote curing of the foamable compositions of this invention in the presence of oxygen include cobaltocene (dicyclopentadienycobalt) and derivatives of cobaltocene wherein one or both of the cyclopentadienyl radicals contain a methyl group as a substituent. The amount of this catalyst should be sufficient to promote curing of the mercaptoorganosiloxane(s) in the presence of oxygen. Varying the catalyst concentration can alter the rate of curing. This is particularly true for elastomeric materials such as the present foams. Catalyst concentrations of from 0.01 to 6 parts by weight per 100 parts of mercaptoorganosiloxane are useful, with from 0.08 to 0.3 parts being preferred to achieve an acceptable balance between cure rate and the properties of the cured foam.

Cobaltocenes are oxidized by air and can absorb carbon dioxide. Water also appears to reduce the catalytic activity of these compounds somewhat, resulting in a longer cure time. It is therefore preferable to dissolve the cobaltocenes in a non-polar organic solvent such as toluene to isolate them from the atmosphere. We have utilized an 8 percent by weight solution of cobaltocene in toluene with good results. Methods for preparing cobaltocenes can be found, for example, in an article by Green, Pratt and Wilkinson entitled, "A New Type of Transition Metal-Cyclopentadiene Compound" [Journal of the Chemical Society, pp. 3753–3767(1959)] which is hereby incorporated by reference to teach the production of cobaltocenes useful in the present invention.

It is believed that mercaptoorganosiloxanes polymerize or cure to form higher molecular weight products by the formation of disulfide (—SS—) bonds upon exposure to oxygen due to the action of the cobaltocene catalyst.

The foamable compositions of this invention polymerize or cure rapidly at room temperature and appear to cure from the surface in contact with oxygen inward. Elastomeric compositions have been shown to cure in a 0.3 centimeter thick section in 5 hours and in a 2.5 centimeter thick section in fourteen days. Heating will accelerate the rate of cure in the manner that most chemical reactions are accelerated by raising the environmental temperature. Compositions containing small amounts of mercapto groups, i.e., less than 2 weight percent, are essentially free of offensive odor. When compared to compositions which evolve acetic acid during cure, the compositions of this invention are non-corrosive to the substrate and evolve practically no volatile by-products of cure. The polymerization reaction only requires the presence of oxygen, which is readily available from the atmosphere.

The foam stabilizer, referred to hereinabove as ingredient (B), maintains the cellular structure of the initially produced froth until (A) has cured to the extent that the structure becomes self supporting. The examples which form part of U.S. Pat. No. 4,518,716 demonstrate that foams having average cell sizes below about 4 mm. and cell concentrations greater than about four per linear centimeter are not formed if the stabilizer is omitted from foamable moisture curable polyorganosiloxane compositions or is replaced by materials discussed hereinbefore as effective for reducing the density of foams prepared using formulations containing silicon-bonded hydroxyl groups and silicon-bonded hydrogen atoms.

The foam stabilizers (B) are resinous, benzene-soluble organosiloxane copolymers wherein the repeating units include, but are not limited to, $SiO_{4/2}$ units, $(CH_3)_3SiO_{\frac{1}{2}}$ units and fluorine-containing units comprising at least four perfluorinated carbon atoms and represented by R and R'' in the foregoing formulae. Each of the fluorine-containing units also includes one or two silicon atoms that are joined to the fluorine-containing carbon atoms by a sequence of at least two methylene ($-CH_2-$) units or by an oxygen atom that is, in turn, bonded to said sequence. This sequence forms part of the group represented by R and R'' in the foregoing formulae.

The fluorine-containing units of (B) can be identical or different. These units exhibit the general average formula $R_a R_b' SiO_{(4-a-b)/2}$ or $R''[Si(R')_b O_{(3-b)/2}]_2$. In these formulae R and R'' represent, respectively, monovalent and divalent fluorinated organic radicals as described hereinbefore, R' is alkyl containing from 1 to 3 carbon atoms, a is 1 or 2, b is 0, 1 or 2 and the sum of a and b is 3 or less.

In addition to at least four perfluorinated carbon atoms, R and R'' can include partially fluorinated and/or nonfluorinated carbon atoms. The carbon atoms of R and R'' can be present in the form of linear chains, branched chains or carboxylic rings. The fluorinated carbon atoms comprising R and R'' can be adjacent or separated by nonfluorinated carbon atoms, by atoms such as nitrogen, oxygen or sulfur or by divalent groups such as carbonyl, amido, carboalkoxy, and other groups which will not cause premature curing of the present foamable compositions during storage and will not substantially inhibit curing of the compositions, in the presence of atmospheric oxygen. R and R'' can contain from 4 to 20 or more carbon atoms, but preferably contain from 4 to 16 carbon atoms.

The relative concentrations of $(CH_3)_3SiO_{\frac{1}{2}}$, fluorinated siloxane units and any additional units other than $SiO_{4/2}$ units and hydroxyl groups must be within certain limits for (B) to function effectively. These limits are conveniently expressed in terms of their effect on the surface tension of a hydroxyl terminated polydimethylsiloxane and on the solubility of (B) in this medium.

Specifically, a 10% by weight solution of (B) in a hydroxyl-terminated polydimethylsiloxane exhibiting a viscosity of 0.08 Pa.s at 25° C. should exhibit a surface tension of less than $2.2 \times 10^{-4}$ newtons per centimeter at 25° C. Furthermore, at this same concentration level and temperature the solution must be either optically clear or become optically clear following the addition of not more than 100%, based on the weight of said solution, of xylene.

While not wishing to be bound by any theory, it appears that in addition to decreasing the surface tension of a foamable composition, effective foam stabilizers must exhibit only limited solubility in the composition. The low degree of solubility ensures that at least a portion of the stabilizer will be present at liquid-gas interfaces of the cellular structure of the froth formed by the action of the blowing agent on (A) thereby reducing the surface tension at the liquid-air interfaces and increasing the stability of the froth during the curing reaction. The relatively high viscosity of the present foam stabilizers is believed to impart additional stability to the froth during curing by increasing the elasticity of the cell walls in addition to reducing the rate at which liquid drains from the cellular structure.

The molar ratio of units other than silicon-bonded hydroxyl groups in (B) and $SiO_{4/2}$ units to $SiO_{4/2}$ units is from 0.7:1 to 1.1:1, inclusive. To maximize the efficacy of (B) as a foam stabilizer for the preferred foamable compositions disclosed in the accompanying examples, this ratio is preferably from 0.7:1 to 0.9:1, inclusive.

If the foamable composition contains or generates acidic materials, it may be preferable to employ foam stabilizers wherein the R and R'' radicals of the foregoing formulae are bonded to silicon through a sequence of at least two methylene units, resulting in a silicon carbon bond. The reason for this preference is that silicon-oxygen-carbon bonds are apparently more susceptible to cleaving in the presence of acids than silicon carbon bonds. This cleaving appears to destroy or substantially diminish the efficacy of ingredient (B) as a foam stabilizer.

In addition to the silicon-containing units disclosed hereinbefore, (B) typically contains from 0.2 up to about 4% by weight of silicon-bonded hydroxyl groups. As disclosed hereinbefore, under certain conditions (B) can also contain up to about 10 weight % of $GSiO_{3/2}$ units, where G represents the residue obtained by removing the hydrogen atom from a hydroxyl group of a hydroxyl containing linear organic polymer. Useful organic polymers include homopolymers of ethylenically unsaturated alcohols such as allyl and cinnamyl alcohol, copolymers of these alcohols with ethylenically unsaturated hydrocarbons such as styrene, and polyethers or polyoxyalkylene glycols containing an average of at least one terminal hydroxyl group per molecule. Preferred polymers include styrene/allyl alcohol copolymers and polyoxyalkylene glycols such as polyoxyethylene glycol.

While not a required part of (B), the presence of $GSiO_{3/2}$ units is desirable because they permit (B) to function as an effective stabilizer with less fluorine than would be required if the $GSiO_{3/2}$ units were absent. Because in many instances hydroxyl-containing organic polymers corresponding to the formula GH are considerably less expensive than the fluorine-containing intermediates used to prepare (B), it is usually preferable to employ these organic polymers in place of the additional fluorine-containing intermediate needed to decrease the solubility of (B) in (A).

Resinous copolymers wherein fluorine-containing hydrocarbon radicals are bonded to silicon through at least two methylene units can be prepared by reacting aqueous sodium silicate, trimethylchlorosilane and (1) a fluorine-containing silane of the formula $R_aR_b'SiCl$ where the sum of a and b is 3, (2) a fluorinated silane of the formula $R''[Si(R)_2Cl]_2$, or (3) suitable derivatives of either (1) and/or (2) wherein the chlorine atoms are replaced by other hydrolyzable groups. The reaction of a non-fluorinated triorganochlorosilane with an aqueous sodium silicate solution is described by Daudt et al. in U.S. Pat. No. 2,676,182, which issued on Apr. 20, 1954. The disclosure of this patent is incorporated herein in its entirety by reference. The reaction of fluorine-containing silanes with sodium silicate is disclosed in U.S. Pat. No. 3,328,349, which issued on June 27, 1967 to Lentz and is incorporated herein in its entirety by reference. In accordance with a combination of Lentz's and Daudt et al.'s teaching, an aqueous solution of sodium silicate (e.g. No. 9 sodium silicate sold by E. I. Dupont de Nemours and Co.) is acidified to the proper pH by adding it to a mixture of hydrochloric acid and isopropanol. The resulting acidic silica hydrosol can then be treated with a source of fluorine-containing $R_aR_b'SiO(4-a-b)/2$ siloxane units, such as $(R)(CH_3)_2SiOCH_3$ or $(R)(CH_3)_2SiCl$, and a source of $(CH_3)_3SiO_{\frac{1}{2}}$ units, such as $(CH_3)_3SiCl$. These reactants are preferably first dissolved in a mixture of isopropanol and xylene. If chlorosilanes are used, acidification of the sodium silicate may not be required.

After being heated for the time interval required to substantially complete the reaction, the resultant mixture is cooled, whereupon it separates into an aqueous phase, which is discarded, and a nonaqueous phase containing the resinous copolymer. The nonaqueous phase is washed with water to reduce its acid number and remove water-soluble components, such as isopropyl alcohol. Preferably the resinous copolymers prepared by this method are washed with water to remove most, but not all of the acid. The products typically have sufficient acid to provide an acid number of from 0.2 to 2.0.

The fluorinated silanes and siloxanes that can be used to prepare (B) are either known or can be synthesized using known methods. The synthesis of preferred silanes is described in the accompanying examples.

If organic solvents are used to prepare the foam stabilizer (B), these are preferably replaced with a trimethylsiloxy endblocked polydimethylsiloxane exhibiting a viscosity of from about 0.001 to about 1 Pa.s at 25° C.

If it is desired to incorporate repeating units of the foregoing $GSiO_{3/2}$ type into the copolymer, this can be accomplished by including the corresponding hydroxyl-containing polymer GH in the reaction mixture together with the fluorinated reactant. Suitable polymers have been discussed hereinbefore.

A second method for preparing foam stabilizers containing either SiO or SiC bonds comprises reacting nonfluorinated resinous copolymers of the type described in the aforementioned Daudt et al. patent with a fluorinated material. Suitable copolymers contain $(CH_3)_3SiO_{\frac{1}{2}}$ and $SiO_{4/2}$ units in addition to from 0.5 to 4.0% by weight of silicon-bonded hydroxyl groups.

The copolymers are reacted with at least one fluorine-containing silane of the formula $R_aR_b'SiY_{(4-a-b)}$ or $YSi(R')_2R''(R')_2SiY$, a partial hydrolysis product of either of the foregoing silanes or at least one fluorine-containing alcohol of the formula $F(C_nF_{2n})(CH_2)_2OH$ where R, R', R'', a and b are defined hereinbefore, Y is a halogen, preferably chlorine or other hydrolyzable group and the average value of n is from 4 to 20.

In preferred embodiments of (B), R of the foregoing formula represents $F(C_nF_{2n})(CH_2)_2O_c$, R' is methyl, R'' represents $-O_c(CH_2)_2C_nF_{2n}(CH_2)_2O_c-$, c is 0 or 1, and the average value of n is at least 4. Most preferably R represents a mixture of homologous units wherein n is an even integer from 4 to 14 inclusive.

The silanes employed to prepare preferred embodiments of (B) wherein c of the foregoing formulae is 0 exhibit the formulae $F(C_nF_{2n})CH_2CH_2Si(CH_3)_dY_{3-d}$ or $Y_{3-d}(CH_3)_dSiCH_2CH_2(C_nF_{2n})CH_2CH_2Si(CH_3)_dY_{3-d}$ where d is 0, 1 or 2 and n is as defined hereinbefore. These silanes can be prepared by hydrosilation of a fluorinated olefin of the formula $F(C_nF_{2n})CH=CH_2$ or $CH_2=CH(C_nF_{2n})CH=CH_2$ with a silane of the formula $(CH_3)_dY_{3-d}SiH$. The fluorinated olefin can be a single compound or a mixture of homologs wherein n is preferably an even integer having a value of from 4 to 14, inclusive. The hydrosilation reaction is typically carried out at temperatures of from 150° to 300° C. using as the catalyst an organic peroxide or a platinum-containing material such as chloroplatinic acid. The hydrosilation of fluorinated olefins is disclosed, for example, in U.S. Pat. No. 3,620,992, which issued to Kim and Pierce on Nov. 16, 1971 and is incorporated herein in its entirety by reference.

The preferred foam stabilizers wherein c is 1 and a method for preparing these stabilizers are claimed in a U.S. patent application Ser. No. 664,898 entitled "Polyorganosiloxane Compositions" that was filed on Oct. 26, 1984 in the name of Joseph Woodward Keil.

Preferred foam stabilizers of the foregoing formula where c is 0 are claimed in U.S. Pat. application Ser. No. 664,897, filed on Oct. 26, 1984 and entitled, "Novel Fluorinated Organosiloxane Copolymers."

The foam stabilizer (B) typically constitutes from 0.2 to about 25% by weight of the present foamable compositions, excluding the weight of the volatile blowing agent (C). This value is preferably from 1 to 10% by weight. The minimum concentration of (B) that will adequately maintain the structure of the initially produced liquid froth during curing is a function of several variables, including viscosity of the foamable composition, the rate at which the composition cures and the fluorine content of (B).

Higher concentrations of fluorine in (B) are desirable, because as the fluorine content of (B) increases, it becomes less compatible with the other ingredients of the present foamable compositions, and is more likely to migrate to the surface of the bubbles that constitute the froth formed when the composition is dispensed from the pressurized container in which it is stored. An alternative method for decreasing the compatibility of (B) with the composition is to incorporate units of the foregoing formula $GSiO_{3/2}$ into (B).

The foamable compositions of this invention can optionally contain up to 50% by weight, based on the total weight of the composition, of finely divided fillers conventionally employed in polyorganosiloxane compositions.

Fume silicas are preferably used at concentrations of from 10 to 20%, based on the weight of the foamable composition.

Finely divided silica fillers are typically treated with relatively low molecular weight, liquid hydroxyl containing organic or organosilicon compounds to prevent a phenomenon referred to in the art as "crepe-hardening" of polyorganosloxane compositions. The filler particles can be treated before being added to the composition or the particles can be treated "in situ" by having a suitable treating material present as an ingredient in the compositions. Known filler treating agents include hydroxyl-containing silanes and polydiorganosiloxanes where the hydrocarbon groups present on silicon are lower alkyl such as methyl, and can also include phenyl, vinyl and 3,3,3-trifluoropropyl.

Other useful fillers include chopped and flocked glass fibers and flame blown glass microfibers. The glass fibers are preferably less than about 8 mm long and less than about $5 \times 10^{-3}$ mm in diameter. Larger diameter fibers can be used, but are not as effective in modifying the flow properties of the foamable composition as the preferred fibers. The larger fibers may also interfere with dispensing of the composition through conventional aerosol valves by clogging passages within the valve.

If a black or grey foam is acceptable, up to about 30% by weight, based on the foamable composition, of carbon black can be added in place of or in combination with glass or other types of fibers.

The combination of carbon black with platinum or a platinum compound such as chloroplatinic acid will impart flame retardancy to the cured foam.

Some compositions containing silica in combination with glass fibers and/or carbon black will be nonslumping when used in combination with blowing agents such as nitrogen, isobutane or chlorinated fluorocarbons such as trifluorochloromethane. A nonslumping composition will not flow appreciably when dispensed onto a vertical or a sloping surface. This characteristic is very desirable if the present compositions will be used to fill joints or other open spaces in a vertical member such as a wall, or in the lower surface of a horizontally oriented member such as the ceiling of a building or other structure.

The foamable compositions of this invention are converted to foams by the action of the blowing agent, referred to hereinbefore as (C). The blowing agent is packaged together with the other ingredients of the compositions in a pressurizable container such as an aerosol can. When the resultant mixture is released from the container it forms a froth that cures over a period of from several minutes to several hours to a solid, elastomeric foam in the presence of atmospheric moisture.

Ingredient (C) can be any material that is a gas at 25° C. under atmospheric pressure. Some blowing agents, such as isobutane, can be liquified under the pressure used to store the present compositions, and when liquified are both miscible and unreactive with said compositions. Other blowing agents, such as nitrogen and compressed air, are gases at the pressures under which the compositions are stored. Suitable liquifiable blowing agents include aliphatic hydrocarbons containing three or four carbon atoms, dimethyl ether, fluorocarbons and chlorofluorocarbons. Nitrogen, compressed air, carbon dioxide and isobutane are particularly preferred on the basis of their cost and availability. Chlorofluorocarbons such as trifluorochloromethane will function as liquifiable blowing agents but are considered undesirable for ecological reasons in some countries.

Ingredient (C) can constitute from about 5 to about 85% of the total weight of the present foamable compositions. The optimum concentration range is dependent upon a number of variables, the most influential of which appears to be the viscosity of the foamable composition, which is, in turn, to a large extent dependent upon the viscosity of (A) and the type and amount of silica and other filler(s) present.

The optimum concentration of (C) is one that provides the best balance between stability of the froth during curing, a sufficiently rapid discharge rate of the composition from the container in which it is stored and a relatively low density cured foam.

Too high a concentration of (C) may destroy the cellular structure of the initial froth, while too low a concentration may increase foam density to unacceptably high levels.

If the composition is very viscous and/or contains a filler that impedes flow of the composition through the valve of the pressurized container, it may be desirable to package the entire composition, including blowing agent in one compartment of a 2-compartment can wherein only this compartment is equipped with a valve for dispensing the composition. The second compartment is separated from the first by means of a piston or a flexible wall and contains a propellant that can be of the same composition as the blowing agent or can be a more volatile material. The propellant provides the additional pressure required to dispense the foamable composition from the pressurized container at a faster rate than can be achieved using only the blowing agent. Two compartment aerosol cans are known in the art.

All other conditions being equal, the maximum rate at which a foamable composition of this invention can be dispensed from a pressurized container and the rate at which liquid materials will drain during curing of the foam are both inversely proportional to the viscosity of the foamable composition as determined using a rotating spindle type viscometer. A preferred viscometer is referred to as a Brookfield viscometer. To obtain useful foams the viscosity of the composition should be from 0.5 to 500 Pa.s at 25° C., measured in the absence of the blowing agent (C). The optimum combination of a relatively rapid dispensing rate and stability of the resultant cellular structure during curing is achieved without an excessive amount of blowing agent when the viscosity of the foamable composition in the absence of blowing agent is from 1 to 100 Pa.s at 25° C.

The foamable compositions of this invention can be prepared by packaging the foregoing ingredients, (A), (B) and (C), together with any of the optional additives discussed hereinbefore, under substantially anaerobic conditions in an air-tight container, such as an aerosol can, that is capable of withstanding the pressure exerted by the blowing agent and any propellent employed.

The pressurized containers used to package the foamable compositions are equipped with valves wherein the passages through which the composition flows are of sufficient diameter to permit discharge of the composition at a sufficiently rapid rate to form a useful foam. If the composition will be dispensed in portions over a period of several days or weeks, those passages within the valve and spray head that are exposed to the atmosphere should be capable of being sealed to minimize contact with oxygen and resultant curing of foamable composition remaining in these passages. It is also desirable that the passages be of a sufficient diameter to facilitate removal of cured material by mechanical means such as a wire or probe.

Preferably the valves are of the toggle type recommended for dispensing relatively viscous, foamable materials such as whipped cream. Most preferably the discharge tube and valve body are combined in a single elastomeric member that is force fitted into the opening of the container. One or more openings in the valve body are normally closed off by contact with the seat. Displacement of the discharge tube by finger pressure moves the opening(s) in the valve body away from the seat, thereby allowing the contents of the pressurized container to flow into the valve body and through the discharge tube.

Aerosol valves wherein the valve body and spray head are separate units and the valve is equipped with a spring loaded piston are suitable for use with unfilled foamable compositions and those containing finely divided fillers such as silica.

In accordance with one such preparative method, the polymer portion of (A), the foam stabilizer (B) and any optional additives such as pigments, adhesion promoters and flame-retarding agents are blended to homogeneity before being combined and blended with the cobaltocene catalyst. This operation is preferably conducted under conditions that avoid contact between these ingredients and atmospheric oxygen. The resultant composition is then transferred into a pressurizable container, such as an aerosol can, that is equipped with a dispensing valve. The desired amount of blowing agent (C) is then inserted into the container by appropriate means, usually through the dispensing valve, and the container is shaken to uniformly dispense the blowing agent throughout the composition. Alternatively, the blowing agent can be introduced between the container and valve assembly before the latter is crimped into place. Methods and apparatus for packaging oxygen-sensitive materials together with propellants such as isobutane and nitrogen into pressurized containers are well known in the art and do not form part of this invention.

For large scale foam preparations where storage of a foamable composition is not required, a mixture of (A) and (B) together with any other nonvolatile ingredients is dispensed from one container and the gaseous or liquified blowing agent (C) is dispensed from a pressurized storage container. The ingredients are combined in a suitable mixing head and the resultant foam is dispensed at the desired location.

As disclosed hereinbefore, preferred foamable compositions of this invention are stable for periods of up to six months or more when stored in pressurized containers that exclude atmospheric oxygen. When dispensed from these containers the compositions are converted to a liquid froth by action of the blowing agent (C). Over a period of several minutes, a self supporting foam is formed by the curing of mercaptopolyorganosiloxane (A) in the presence of atmospheric oxygen. During this interval the foam stabilizer (B) minimizes collapse of the cellular structure and drainage of liquid materials.

Cured foams prepared using the compositions of this invention are typically of the closed cell type. Those which do not contain silica or other filler typically exhibit densities of from 0.20 to about 0.55 g/cm$^3$. The size of the cells in the foam will typically be less than 4 mm in diameter. Preferably the size range is from 0.2 to 2 mm, and the cell concentration is typically greater than 4 per linear cm.

The present foams can be used in many applications where it is desirable to utilize the unique properties of polyorganosiloxane elastomers in a low density material. The lower density of the foams relative to corresponding noncellular elastomers makes it possible to cover a larger area with the same weight of material. An additional advantage is the insulating properties provided by the closed cell structure of the foam.

The ability of compositions containing the preferred foam stabilizers to remain stable in a pressurized container makes it possible to combine in a single, portable package such as an aerosol container, all of the ingredients required to form a foam. The package can then be transported to the location where the foam is to be applied rather than having to transport the individual ingredients to the location and blend them in the required amounts to obtain a homogeneous composition just prior to forming the foam. This is particularly advantageous in those instances when relatively small amounts of foam are to be dispensed over a relatively long period of time.

The following examples disclose preferred embodiments of the present foamable compositions and should not be interpreted as limiting the scope of the accompanying claims. All parts and percentages are by weight unless otherwise specified.

EXAMPLE

Two foamable compositions of this invention exhibiting viscosities within the range of from 0.5 to 500 Pa.s at 25° C. were prepared using the following amounts of ingredients, expressed in parts by weight.

|  | I | II |
|---|---|---|
| Mercaptoorganosiloxane A1 | 25.0 | 56.5 |
| Mercaptoorganosiloxane A2 | 15.0 | 33.8 |
| Calcium Carbonate | 30.0 | 33.9 |
| Foam Stabilizer | 2.0 | 4.48 |
| Cobaltocene (as an 8% solution in toluene) | 0.7 | 1.25 |
| Blowing Agent (Isobutane) | 9.0 | 16.0 |

Mercaptoorganosiloxane A1 was a trimethylsiloxy endblocked dimethylsiloxane/2-mercaptoethylmethylsiloxane copolymer containing 0.75 mole percent of pendant mercapto (-SH) units. The copolymer was prepared by reacting a mixture containing 98.5 weight percent of a cyclic polydimethylsiloxane, 1.2 weight percent of a hydrolysis product of methyl-2-mercaptoethyldichlorosilane and 0.27 weight percent of hexamethyldisiloxane. The reaction was conducted at a temperature of 65° C. in the presence of trifluoromethanesulfonic acid as the catalyst. At the completion of the reaction the catalyst was neutralized using sodium bicarbonate.

Mercaptoorganosiloxane A2 was prepared in a similar manner by reacting a mixture of 98.12 weight percent of cyclic dimethylsiloxane oligomers with 1.88 weight percent of 1,3-bis(3-mercaptopropyl)-1,1,3,3-tetramethyldisiloxane in the presence of 0.1 percent, based on total reactants, of trifluoromethanesulfonic acid.

The foam stabilizer was a 50% by weight solution in a trimethylsiloxy endblocked polydimethylsiloxane of the reaction product of (1) a mixture of homologous fluorinated alcohols of the general formula F(CF$_2$)$_n$CH$_2$CH$_2$OH, available as Zonyl ® BA fluoroalcohol from E. I. DuPont deNemours and Co., with (2) an organosiloxane copolymer of the type described by Daudt and Tyler in U.S. Pat. No. 2,676,182. The copolymer contained $(CH_3)_3SiO_{\frac{1}{2}}$ units and $SiO_{4/2}$ units in a molar ratio of about 0.7:1, respectively, and about 3% by weight of silicon-bonded hydroxyl groups.

The foam stabilizer was prepared by combining 996 parts of a 68.3 weight % solution of the aforementioned organosiloxane copolymer in isomeric xylenes, 484 parts of isomeric xylenes, 4.29 parts by weight of a 1N solution of potassium hydroxide in ethanol and 120 parts by weight of molten Zonyl BA fluoroalcohol. The resultant mixture was heated for $2\frac{1}{2}$ hours in a reaction vessel equipped with a reflux condenser and a Dean Stark apparatus. The reaction mixture was allowed to cool to 50° C., at which time solid carbon dioxide was added to neutralize the reaction mixture. The mixture was then filtered and combined with 800 parts of a trimethylsiloxy endblocked polydimethylsiloxane exhibiting a viscosity of 0.01 Pa.s at 25° C. Xylene and other volatile materials were then removed by heating the resultant solution until the vapor temperature reached 110° C. under a pressure of less than 0.67 kilopascal. The final solution contained 50% by weight of a foam stabilized of this invention in the trimethylsiloxy endblocked polydimethylsiloxane.

The foam stabilizer included repeating units of the formulae $(CH_3)_3SiO_{\frac{1}{2}}$, $SiO_{4/2}$ and fluorine-containing units of the average formula $F(CF_2)_8CH_2CH_2OSiO_{3/2}$. The surface tension exhibited by a 10% by weight solution of the foam stabilizer in a hydroxyl-endblocked polydimethylsiloxane having a viscosity of 0.08 Pa.s at 25° C. was less than $2.2 \times 10^{-4}$ newtons per cm. when measured at 25° C., and the solution required the addition of less than 100 weight percent of xylene to achieve optical clarity.

The two mercaptoorganosiloxanes were blended together with the calcium carbonate using a 3-roll mill. The resultant mixture was placed in a Sem Kit ® tube (commercially available from Semco, Inc., Division of Products Research and Chemical Corp., Glendale, Calif.). This device is a cylinder formed from polyethylene, resembles a tube commonly used to package caulking compounds and incorporates a means for adding materials and stirring the contents of the tube with the exclusion of atmospheric oxygen. The foam stabilizer and cobaltocene solution were then added. The resultant composition was mixed for about one minute and then transferred into a conventional one-compartment aerosol can without coming into contact with atmospheric oxygen. The formulation exhibited a viscosity within the range of from 0.5 to 500 Pa.s at 25° C. The valve assembly was then placed on the can and the contents of the can were placed under a negative gauge pressure of about 2.7 kPa for about 2 seconds before the valve assembly was attached to the can by crimping. Liquified isobutane was then introduced through the valve and the can was shaken by hand for 1 minute to distribute the blowing agent homogeneously throughout the composition. The valve assembly consisted of a type R-70-118 valve and a type 182-125 sprayhead, both manufactured by Newman Green, Inc. The sprayhead is of the type recommended for use with aerosol-type fire extinguishers.

Foams were prepared by discharging a portion of the contents of the can into a small glass cosmetic jar to a depth of about 1.3 cm. When the foam had cured, a sample of known volume was removed and weighed to determine density. The average cell size was determined optically using a rule with a millimeter scale. The volume percent of cured foam relative to noncellular cured rubber in the jar is referred to as "% foam" in the following table.

|  | I | II |
| --- | --- | --- |
| Foam Density (g./cc) | 0.74 | 0.64 |
| Cell Diameter (mm) | 0.5–1 | 0.5–1 |
| % Foam | 95 | 80 |

Both foams were of the closed cell type and the cells were uniformly distributed throughout the foam portion of each sample.

That which is claimed is:

1. A foamable polyorganosiloxane composition exhibiting a viscosity of from 0.5 to 500 Pa.s at 25° C. in the absence of blowing agents, where said composition is stable during storage under anaerobic conditions and superatmospheric pressure, and in the presence of atmospheric pressure and oxygen yields a cured, closed cell polyorganosiloxane foam exhibiting a uniform distribution of cells no larger than about 4 mm., said composition comprising the product obtained by mixing in the absence of oxygen (A) an oxygen curable elastomeric composition comprising (1) a mercapto organosiloxane polymer containing an average of more than two siloxane units per molecule having a mercaptoalkyl or mercaptoalkylene group bonded to silicon, the remaining siloxane units exhibiting the average formula $R_p^1SiO_{(4-p/2)}$, where each $R^1$ individually represents an alkyl radical containing from 1 to 4 carbon atoms, a phenyl radical, a 3,3,3-trifluoropropyl radical or an alkoxy radical containing from 1 to 4 carbon atoms, with the proviso that at least 20 mole percent of said siloxane units are dimethylsiloxane, said mercaptoalkylene radical is —$CH_2$—$CH(SH)$—$CH_2$—$CH_2$—, said mercaptoalkyl group contains from 1 to 4 carbon atoms and the value of p is from 1.5 to 2.5, and (2) a cobaltocene of the formula $(R^2C_5H_4)Co(C_5H_4R^3)$ in an amount sufficient to promote curing of (1) in the presence of oxygen, where $R^2$ and $R^3$ are individually selected from hydrogen and methyl;

(B) an amount of a foam stabilizer sufficient to stabilize said foam during the curing process, where (B) consists essentially of a resinous, benzene-soluble organosiloxane copolymer consisting essentially of $SiO_{4/2}$ units, silicon-bonded hydroxyl groups, $(CH_3)_3SiO_{\frac{1}{2}}$ units and fluorine-containing units selected from the group consisting of $R_aR'_bSiO_{(4-a-b)/2}$, $R''[Si(R')_bO_{((3-b)/2)}]_2$ and mixtures thereof, where R is a monovalent organic radical containing at least four perfluorinated carbon atoms and is bonded to the silicon atom of said fluorine-containing units by a sequence of at least two methylene units or by an oxygen atom that is, in turn, bonded to a sequence of at least two methylene units, R' is an alkyl radical containing from 1 to 3 carbon atoms, R'' is a divalent organic radical containing at least four perfluorinated carbon atoms and is bonded to the silicon atom of said fluorine-containing units by a sequence of at least two methylene units or by an oxygen atom that is in turn bonded to a sequence of at least two methylene units, a is 1 or 2, b is 0, 1 or 2 and the sum of a and b is 3 or less, with the proviso that when R and R″ are bonded to silicon via an oxygen atom the organosiloxane copolymer optionally contains repeating units of the formula $GSiO_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than hydroxyl and $SiO_{4/2}$ units to $SiO_{4/2}$ units is from 0.7:1 to 1.1:1, inclusive, and the concentration of said fluorine-containing units and any $GSiO_{3/2}$ units is sufficient to (a) impart a surface tension of less than $2.2 \times 10^{-4}$ newtons per centimeter at 25° C. to a 10 percent by weight solution of (B) in a hydroxyl endblocked polydimethylsiloxane exhibiting a viscosity of 0.08 Pa.s at 25° C. and (b) require the addition of from 0 to 100 percent by weight of xylene to said 10 percent by weight solution to achieve optical clarity; and (C) a blowing agent in an amount sufficient to convert said polyorganosiloxane composition to a foam under atmospheric pressure and at a temperature of 25° C.

2. A composition according to claim 1 where $R^1$ is methyl.

3. A composition according to claim 1 where (A)(1) comprises at least one dimethylsiloxane polymer containing pendant or terminal mercaptoalkyl groups.

4. A composition according to claim 3 where (A)(1) comprises a mercaptoalkyl terminated polydimethylsiloxane and a dimethylsiloxane/methylmercaptoalkylsiloxane copolymer containing at least 3 methylmercaptoalkylsiloxane units per molecule.

5. A composition according to claim 1 where the fluorine-containing units of (B) are of the formula $R_aR'_bSiO_{(4-a-b)/2}$ where R is $F(C_nF_{2n})(CH_2)_2O_d$; R′ is methyl; a is 1; b is 0, 1 or 2; d is 0 or 1 and where in each of said fluorine-containing units n represents an integer that is identical or different with respect to the value of n in other fluorine-containing units of (B), the average value of n being from 4 to 20, inclusive.

6. A composition according to claim 5 where d is 0 and (B) is the reaction product of (1) an organosiloxane copolymer consisting essentially of $(CH_3)_3SiO_{\frac{1}{2}}$ units, $SiO_{4/2}$ units and from 0.2 to about 4.0% by weight of silicon-bonded hydroxyl groups with (2) a mixture of homologous silanes of the formula $F(CF_2)_nCH_2CH_2Si(CH_3)_bCl_{3-b}$, where n varies among said silanes and represents an even integer from 4 to 14, inclusive.

7. A composition according to claim 5 where d is 1 and (B) is the reaction product of (1) an organosiloxane copolymer consisting essentially of $(CH_3)_3SiO_{\frac{1}{2}}$ units, $SiO_{4/2}$ units and from 0.2 to about 4.0% by weight of silicon-bonded hydroxyl groups with (2) a mixture of homologous fluorine-containing alcohols of the general formula $F(CF_2)_n(CH_2)_2OH$, where in each molecule of said alcohols, n represents an even integer from 4 to 14, inclusive.

8. A composition according to claim 7 where (B) contains up to 10%, based on the weight of (B), of $GSiO_{3/2}$ units.

9. A composition according to claim 8 where (G) represents the residue of a styrene/allyl alcohol copolymer.

10. A composition according to claim 1 where (B) constitutes from 1 to 10% of the weight of said composition in the absence of said blowing agent.

11. A composition according to claim 1 where said blowing agent is selected from the group consisting of aliphatic hydrocarbons containing from 1 to 4 carbon atoms, aliphatic chlorofluorocarbons containing from 1 to 4 carbon atoms, carbon dioxide and nitrogen.

12. A composition according to claim 11 where said blowing agent is isobutane.

13. A composition according to claim 1 that is nonslumping and contains a finely divided filler at a concentration level of up to 50%, based on the weight of said composition.

14. A composition according to claim 13 where said filler is silica.

15. A composition according to claim 14 where said composition includes a treating agent for said silica.

16. A composition according to claim 1 where the viscosity of said composition in the absence of said blowing agent is from 1 to 100 Pa.s at 25° C.

17. A composition according to claim 1 that is maintained under superatmospheric pressure in a pressurized container.

18. A composition according to claim 17 where said pressurized container is an aerosol can.

19. A closed cell organosiloxane foam prepared by dispensing and curing the polyorganosiloxane composition of claim 1.

20. A closed cell organosiloxane foam prepared by dispensing and curing the polyorganosiloxane composition of claim 7.

* * * * *